US012607822B2

(12) United States Patent
Uchiyama

(10) Patent No.: US 12,607,822 B2
(45) Date of Patent: Apr. 21, 2026

(54) LENS APPARATUS, IMAGE PICKUP APPARATUS, CONTROL METHOD FOR LENS APPARATUS, AND STORAGE MEDIUM

(71) Applicant: CANON KABUSHIKI KAISHA, Tokyo (JP)

(72) Inventor: Minoru Uchiyama, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 329 days.

(21) Appl. No.: 18/462,516

(22) Filed: Sep. 7, 2023

(65) Prior Publication Data

US 2024/0085660 A1 Mar. 14, 2024

(30) Foreign Application Priority Data

Sep. 9, 2022 (JP) ................................. 2022-143432

(51) Int. Cl.
*G02B 7/10* (2021.01)
(52) U.S. Cl.
CPC ...................................... *G02B 7/10* (2013.01)
(58) Field of Classification Search
CPC .......... G02B 7/10; G02B 7/102; H04N 23/55; H04N 23/50; H04N 23/54; H04N 23/67
See application file for complete search history.

(56) References Cited

U.S. PATENT DOCUMENTS

2008/0025711 A1* 1/2008 Chi ........................ G03B 13/32
348/347

FOREIGN PATENT DOCUMENTS

JP 2021047296 A 3/2021

* cited by examiner

*Primary Examiner* — James C. Jones
(74) *Attorney, Agent, or Firm* — ROSSI, KIMMS & McDOWELL LLP

(57) ABSTRACT

A lens apparatus includes an optical system including a focus lens unit and a magnification-varying lens unit, and a processor configured to control driving of the focus lens unit. The processor is configured to acquire a detected position of the magnification-varying lens unit from a zoom position detector, and determine a target position of the focus lens unit according to a predicted position of the magnification-varying lens unit based on locus information indicating a relationship between a position of the magnification-varying lens unit and a position of the focus lens unit that is in focus at the position of the magnification-varying lens unit, and the detected position of the magnification-varying lens unit.

11 Claims, 12 Drawing Sheets

FOCUS POSITION

LENS APPARATUS, IMAGE PICKUP APPARATUS, CONTROL METHOD FOR LENS APPARATUS, AND STORAGE MEDIUM

BACKGROUND

Technical Field

One of the aspects of the embodiments relates to a lens apparatus, an image pickup apparatus, a method of controlling a lens apparatus, and a storage medium.

Description of Related Art

Japanese Patent Laid-Open No. 2021-47296 discloses a method for reducing out-of-focus (defocus) blur during zooming by predicting a future zoom position from an operation amount of the zoom lens and determining a target position of a focus lens according to the predicted zoom position.

In order to reduce the out-of-focus blur during zooming, a zoom position is to be predicted with high accuracy. However, in moving the zoom lens by rotating the operation member by the user without using a zoom motor, the method disclosed in Japanese Patent Laid-Open No. 2021-47296 has a large backlash component and difficulty in accurately predicting the zoom position. As a result, the out-of-focus blur during zooming cannot be sufficiently reduced.

SUMMARY

A lens apparatus according to one aspect of the embodiment includes an optical system including a focus lens unit and a magnification-varying lens unit, and a processor configured to control driving of the focus lens unit. The processor is configured to acquire a detected position of the magnification-varying lens unit from a zoom position detector, and determine a target position of the focus lens unit according to a predicted position of the magnification-varying lens unit based on locus information indicating a relationship between a position of the magnification-varying lens unit and a position of the focus lens unit that is in focus at the position of the magnification-varying lens unit, and the detected position of the magnification-varying lens unit. An image pickup apparatus including the above lens apparatus also constitutes another aspect of the embodiment. A control method corresponding to the above lens apparatus also constitutes another aspect of the embodiment. A storage medium storing a program that causes a computer to execute the above control method also constitutes another aspect of the embodiment.

Further features of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

Figure 1:
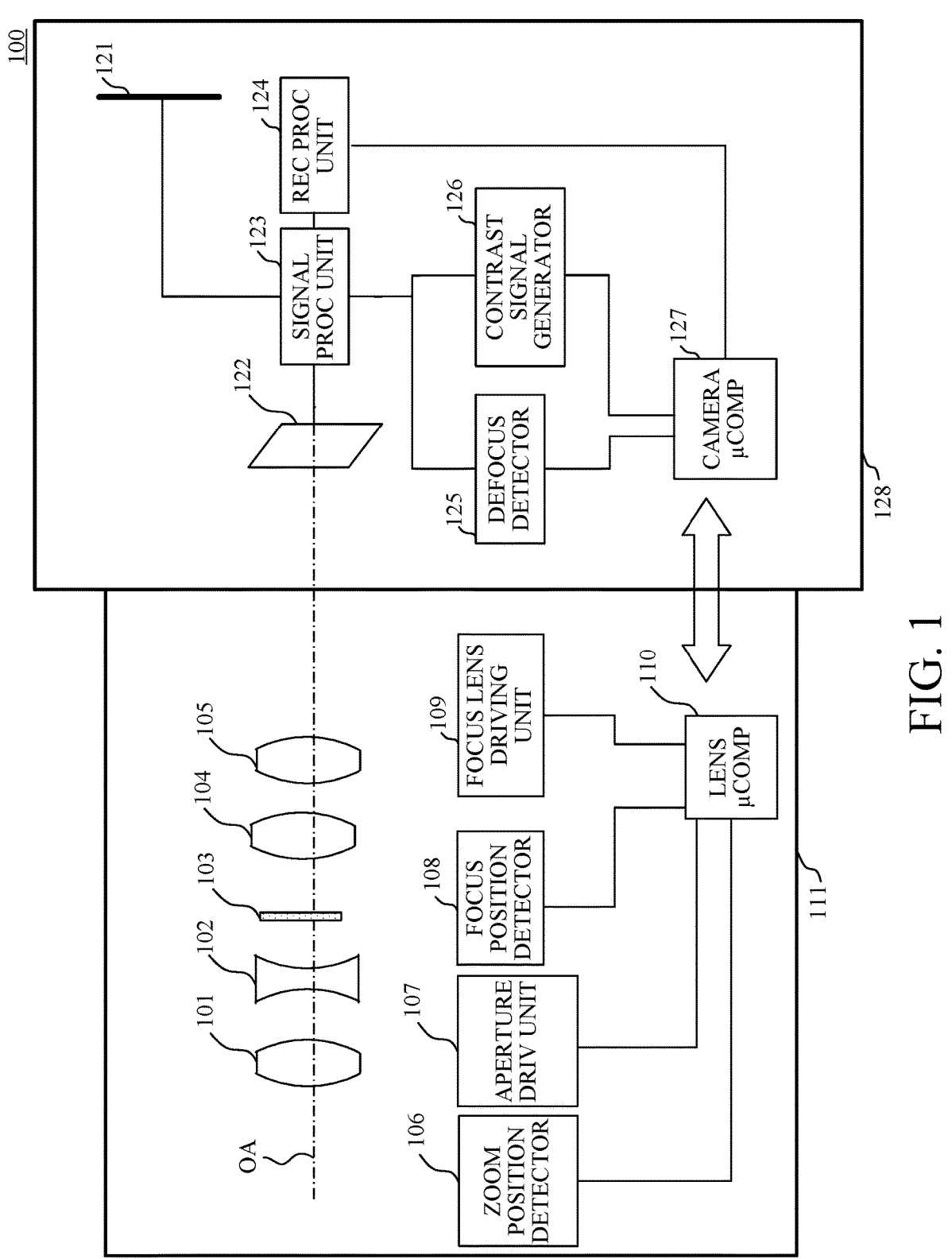
FIG. 1 is a block diagram of an image pickup apparatus according to each of first to fourth embodiments.

Referring now to FIG. 1, a description will now be given of an image pickup apparatus 100 according to each of first to fourth embodiments. FIG. 1 is a block diagram of the image pickup apparatus 100. The image pickup apparatus 100 is a lens interchangeable type camera system, and includes a camera body (image pickup apparatus body) 128 and an interchangeable lens (lens apparatus) 111 attachable to and detachable from the camera body 128. This embodiment is not limited to this example, and is applicable to an image pickup apparatus in which a camera body and a lens apparatus are integrated.

Light from an object forms an image on an image sensor 122 in the camera body 130 via an optical system (imaging optical system) in the interchangeable lens 111. In this embodiment, the optical system includes a first lens 101, a magnification-varying lens unit 102, an aperture stop (diaphragm) 103, a fixed third lens 104, and a focus lens unit 105. Each of the magnification-varying lens unit 102 and the focus lens unit 105 includes one or more lenses.

An electric signal (analog image signal) photoelectrically converted by the image sensor 122 is output to a signal processing unit 123. The signal processing unit 123 performs signal processing such as signal amplification for an analog image signal to generate a digital image signal. The signal processing unit 123 also performs imaging processing such as color correction and white balance to generate image data and outputs the image data to a recording processing unit 124. Image data stored in the recording processing unit 124 can be displayed on an electronic viewfinder (EVF) 121. The digital image signal generated by the signal processing unit 123 is also output to a contrast signal generator 126. The contrast signal generator 126 generates a contrast signal using one or more high-frequency signal integrated values obtained by integrating high-frequency component amounts extracted from a plurality of specific regions of the luminance signal through a high-pass filter. The contrast signal is used to determine the in-focus state based on the magnitude of its value. The contrast signal is output to a camera microcomputer (control unit, processor) 127.

The image sensor 122 outputs a phase difference signal that is used for focus detection by the phase difference detecting method. A defocus detector 125 performs focus detection using the phase difference signal output from the image sensor 122 and calculates the defocus amount. The defocus amount is output to the camera microcomputer 127.

The camera microcomputer 127 communicates with the lens microcomputer (control unit, processor) 110 at predetermined intervals or as necessary. The camera microcomputer 127 can transmit lens control data (focus driving command (driving pulse), optical information acquiring command, aperture command, etc.) to the lens microcomputer 110. The lens microcomputer 110 receives optical data of the interchangeable lens 111 (lens position, sensitivity, focal length, imaging distance, object distance, image distance, best focus correction value, maximum F-number, minimum F-number, exit pupil value, image height exit pupil value, correction value, lens moving amount per pulse, etc.). These data are used for auto-exposure, automatic dimming, autofocus, and the like.

The lens microcomputer 110 uses various lens control data received from the camera microcomputer 127 and drives each component based on the information. The aperture stop 103 can change an aperture amount (F-number) by the aperture driving unit 107 and is driven by receiving a command from the lens microcomputer 110. The aperture driving unit 107 controls an aperture amount of the aperture stop 103 using a stepping motor, a VCM, or the like, and a detector configured to detect an aperture stop position using a Hall sensor that senses the current flowing through the coil or a sensor configured to detect an end position.

The focus lens unit 105 is movable in a direction along the optical axis OA (optical axis direction) by the focus lens driving unit 109. A focus position detector 108 can detect the position of the focus lens unit 105. Thereby, the focus lens unit 105 can be driven according to a moving command from the lens microcomputer 110.

In the interchangeable lens 111, in a case where the user rotates an unillustrated operation unit (zoom operation ring)

in order to change the position (zoom position) of the magnification-varying lens unit 102, the magnification-varying lens unit 102 changes a focal length mechanically linked to the zoom operation ring. At this time, in an attempt to focus on the same object distance by changing the zoom position, the position (focus position) of the focus lens unit 105 changes. Therefore, in order to maintain the in-focus state during zooming, the in-focus state at a specific object distance is to be maintained by moving the focus position corresponding to the zoom position.

Such control that continuously changes the zoom position and focus position is called electronic cam control. For the electronic cam control, the cam locus for the zoom position and the focus position is stored in a memory (storage unit) such as a ROM built in the lens microcomputer 120 as data on representative points of the correspondence relationship between the focus position and the zoom position for each object distance. By referring to the data, the focus lens unit 105 can be moved so as to obtain a proper focus state in accordance with the zoom fluctuation. In addition, for an intermediate (middle) zoom position and a focus position other than representative points, the separation degree (ratio) from the two representative points is calculated, and linear interpolation can be used according to the degree or ratio to obtain highly accurate positions. Even in a case where the focus lens unit 105 has a plurality of focus lenses that are movable independently of each other, the same object distance data for zoom fluctuations can be stored for the plurality of focus lenses, so that a similar method can be applied.

Figure 2:
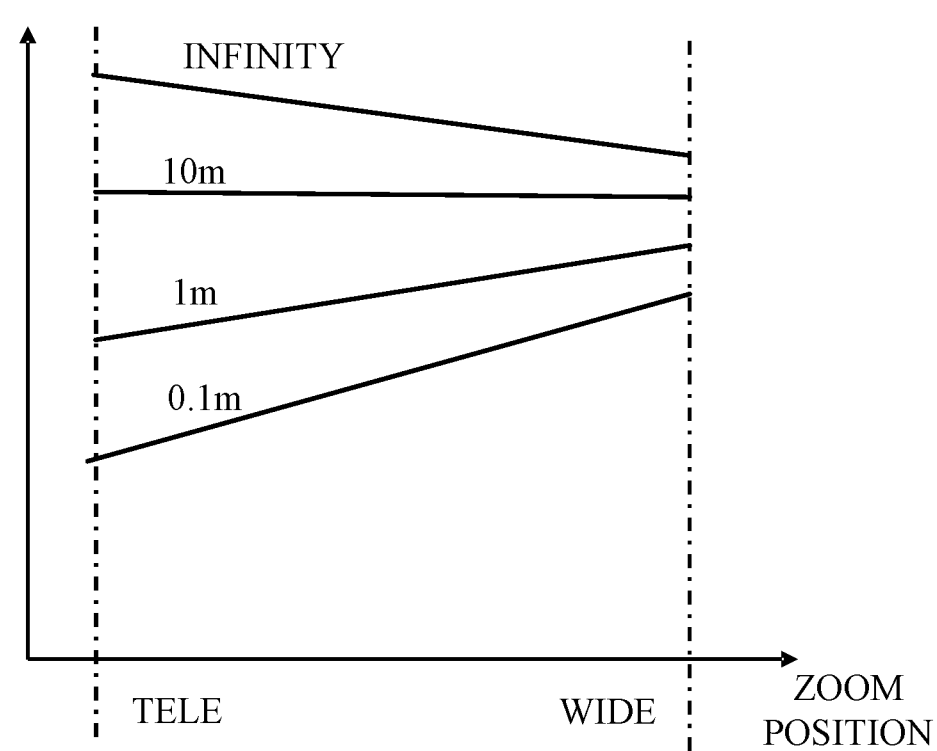
FIG. 2 illustrates a relationship between a zoom position, a focus position, and an object distance in each of the first to fourth embodiments.

FIG. 2 is a diagram (electronic cam data) illustrating a relationship among the position (zoom position) of the magnification-varying lens unit 102, the position (focus position) of the focus lens unit 105, and the object distance. That is, FIG. 2 illustrates locus information indicating a relationship between the zoom position and the focus position at which the zoom position is in the in-focus state. In FIG. 2, a horizontal axis indicates the zoom position (from the telephoto end (TELE) to the wide-angle end (WIDE)), and a vertical axis indicates the focus position. FIG. 2 illustrates four lines of the same object distance of infinity, 10 m, 1 m, and 0.1 m in order from the top. For example, in order to maintain the in-focus state at infinity during zooming, the focus position must be controlled over the line of the same object distance indicated as "infinity" at the top. The same object distances not illustrated in FIG. 2 can be obtained freely by calculating a distance ratio between the cam loci.

Comparative Example

Figure 3:
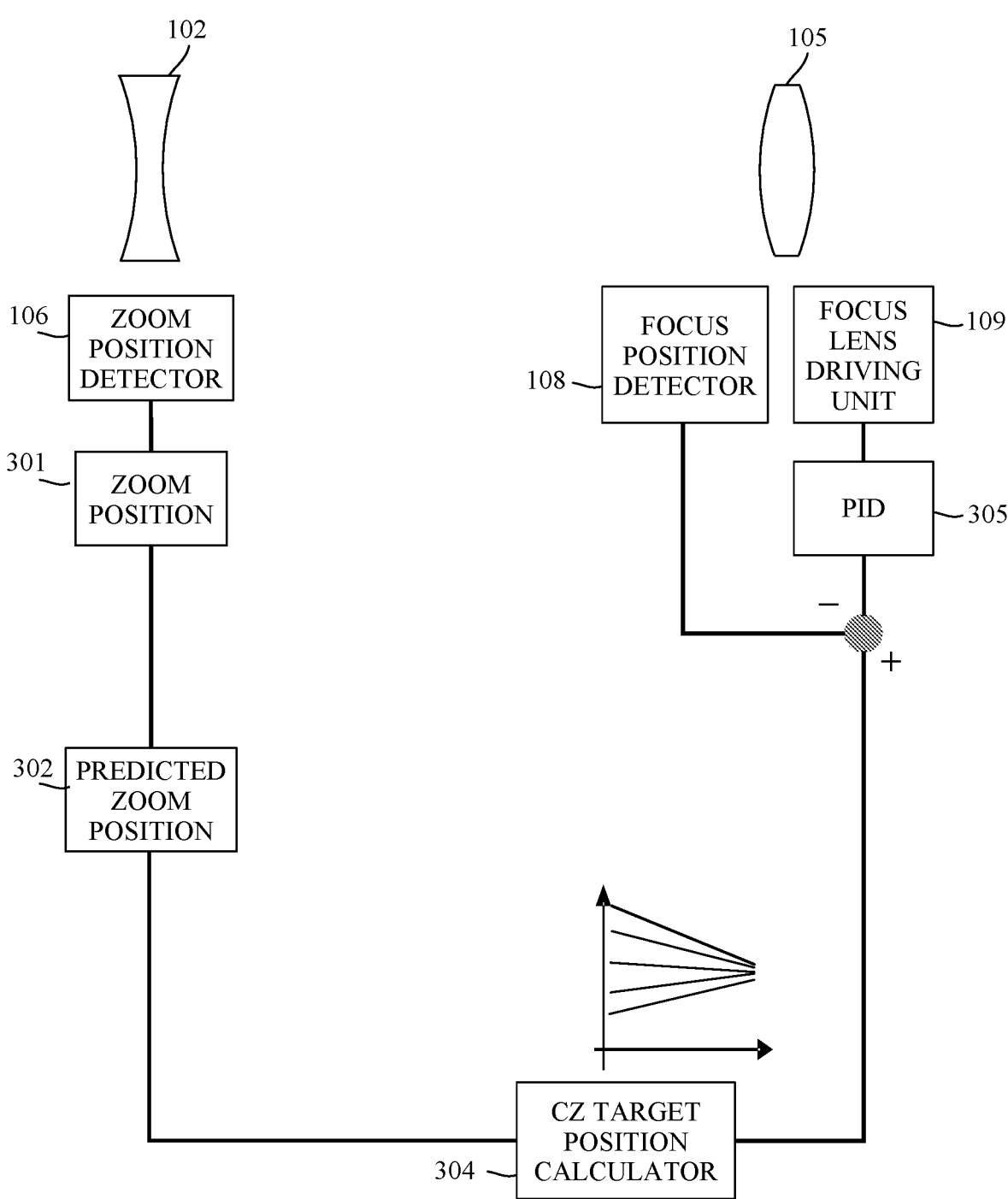
FIG. 3 explains a control method according to a comparative example.

Referring now to FIG. 3, a description will be given of a control method as a comparative example of each embodiment. FIG. 3 explains a control method according to a comparative example.

First, a change in the magnification-varying lens unit 102 (the current position of the magnification-varying lens unit 102) is detected by the zoom position detector 106. The zoom position detector 106 detects the position (zoom position) of the magnification-varying lens unit 102 based on, for example, a change in a variable resistance mechanically linked to the zoom operation ring. The lens microcomputer 110 reads a digital detection signal (zoom position 301) obtained by A/D converting the detected position of the magnification-varying lens unit 102. The lens microcomputer 110 periodically stores data on a zoom position 301 in the internal memory. Then, the lens microcomputer 110 predicts the next speed based on a difference between the plurality of past data regarding the zoom position 301, assuming that the magnification-varying lens unit 102 is in uniform linear motion. The lens microcomputer 110 can predict the acceleration based on the speed change and calculate a predicted zoom position 302 at the next cycle timing.

The lens microcomputer 110 calculates the position (target position) of the focus lens unit 105 that will be in focus at the next cycle using a CZ target position calculator 304 based on the predicted zoom position 302, setting data of the current object distance, and the electronic cam data illustrated FIG. 2. Then, the lens microcomputer 110 performs position feedback control by performing PID control 305 using the focus lens driving unit 109 and the focus position detector 108 so that the focus lens unit 105 moves to the calculated target position.

However, for example, in a case where the user rotates the zoom operation ring to move the magnification-varying lens unit 102 without using the zoom motor, this comparative example has a large backlash component and difficulty in accurately predicting the zoom position. As a result, the out-of-focus blur during zooming cannot be sufficiently reduced.

First Embodiment

Figure 4:
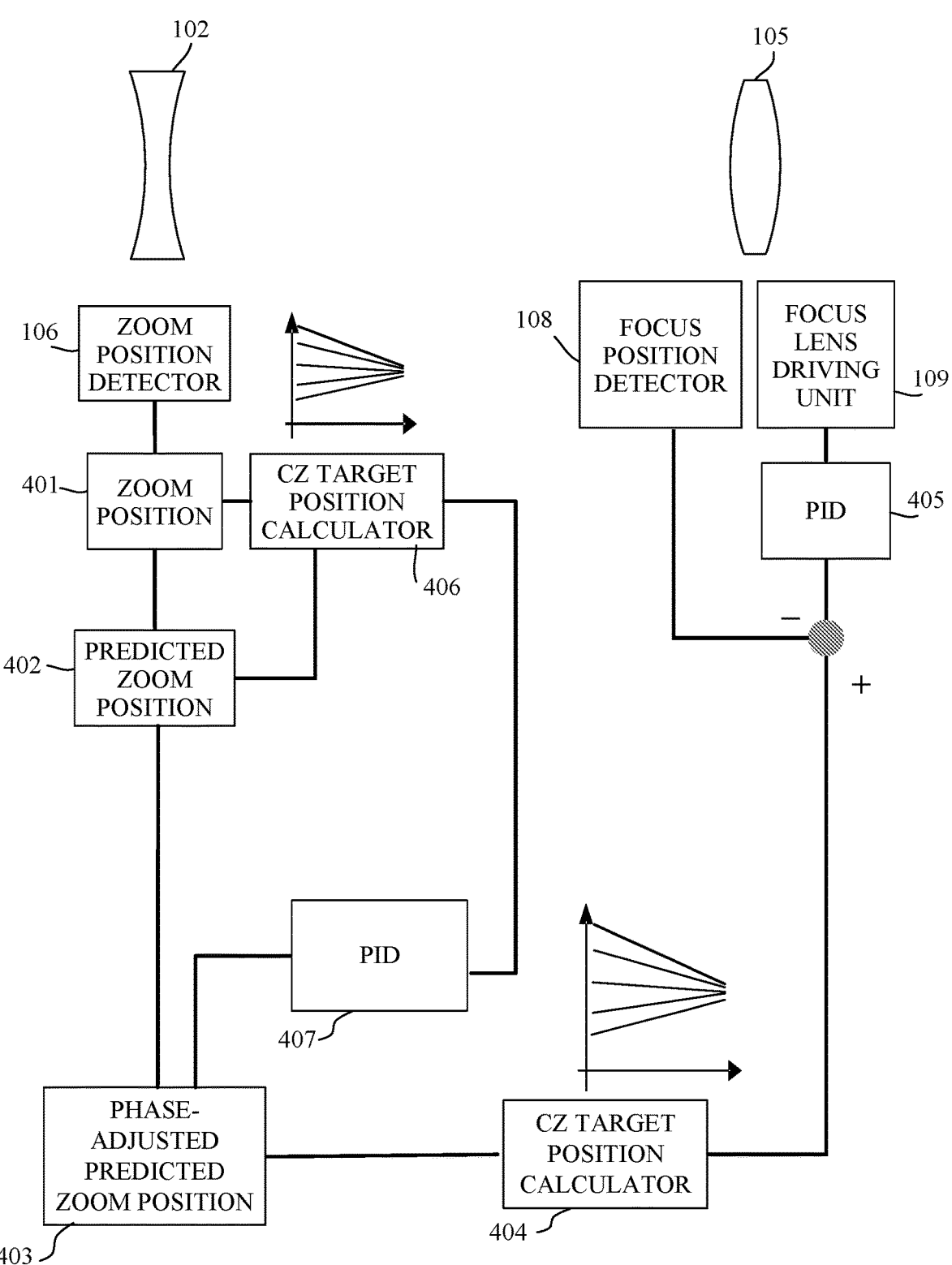
FIG. 4 explains a control method according to a first embodiment.

Referring now to FIG. 4, a description will be given of a control method according to a first embodiment. FIG. 4 explains the control method according to this embodiment.

First, the zoom position detector 106 detects a change in the magnification-varying lens unit 102 (the current position of the magnification-varying lens unit 102). The zoom position detector 106 detects the position (zoom position) of the magnification-varying lens unit 102 based, for example, on a change in a variable resistance mechanically linked to the zoom operation ring. The lens microcomputer 110 then reads a digital detection signal (zoom position 401) obtained by A/D converting the detected position of the magnification-varying lens unit 102. The lens microcomputer 110 periodically stores data on the zoom position (detected position, current position) 401 in the internal memory. Then, the lens microcomputer 110 predicts the next speed based on a difference between the plurality of past data regarding the zoom position 401, assuming that the magnification-varying lens unit 102 is in uniform linear motion. The lens microcomputer 110 can predict the acceleration based on the speed change and calculate a predicted zoom position 402 at the timing of the next cycle.

The lens microcomputer 110 calculates a position change amount (slope of the electronic cam data) of the focus lens unit 105 using a CZ target position calculator 406 based on the current zoom position 401, the predicted zoom position 402, setting data of the object distance, and the electronic cam data illustrated in FIG. 2. Then, the lens microcomputer 110 calculates a corrected position (phase-adjusted predicted zoom position 403) in which delay compensation (phase compensation) is performed for the predicted zoom position 402 by adding a proper PID component 407 to the position change amount.

The lens microcomputer 110 calculates (acquires) the position (target position) of the focus lens unit 105 that will be in focus at the next cycle using the CZ target position calculator 404 based on the phase adjustment predicted zoom position 403, setting data of the current object distance, and the electronic cam data illustrated in FIG. 2. Then, the lens microcomputer 110 performs position feedback control by performing PID control 405 using the focus lens driving unit 109 and the focus position detector 108 so that the focus lens unit 105 moves to the calculated target position.

As described above, the lens microcomputer 110 determines a target position of the focus lens unit 105 according to the predicted position (predicted zoom position 402) of the magnification-varying lens unit 102 based on the locus information (406) and the detected position (zoom position 401) of the magnification-varying lens unit 102.

The lens microcomputer 110 may acquire the predicted position (the predicted zoom position 402) based on the detected position of the magnification-varying lens unit 102. The lens microcomputer 110 then determines the target position of the focus lens unit 105 based on the locus information, the detected position of the magnification-varying lens unit 102, and the predicted position of the magnification-varying lens unit 102.

The lens microcomputer 110 acquires speed information and acceleration information of the focus lens unit 105 using the CZ target position calculator 406 based on the locus information, the detected position of the magnification-varying lens unit 102, and the predicted position of the magnification-varying lens unit 102. Then, the lens microcomputer 110 corrects the predicted position of the magnification-varying lens unit 102 based on the predicted position of the magnification-varying lens unit 102 and the speed information and acceleration information of the focus lens unit 105 (performs phase compensation for the predicted position). Then, the lens microcomputer 110 determines the target position of the focus lens unit 105 based on the corrected predicted position (phase-adjusted predicted zoom position 403).

Thus, performing position feedback control for the focus lens unit 105 using the phase adjustment predicted zoom position 403 can reduce the phase delay of the predicted zoom position and sufficiently reduce the out-of-focus blur caused by the change of the zoom position.

Figure 5:
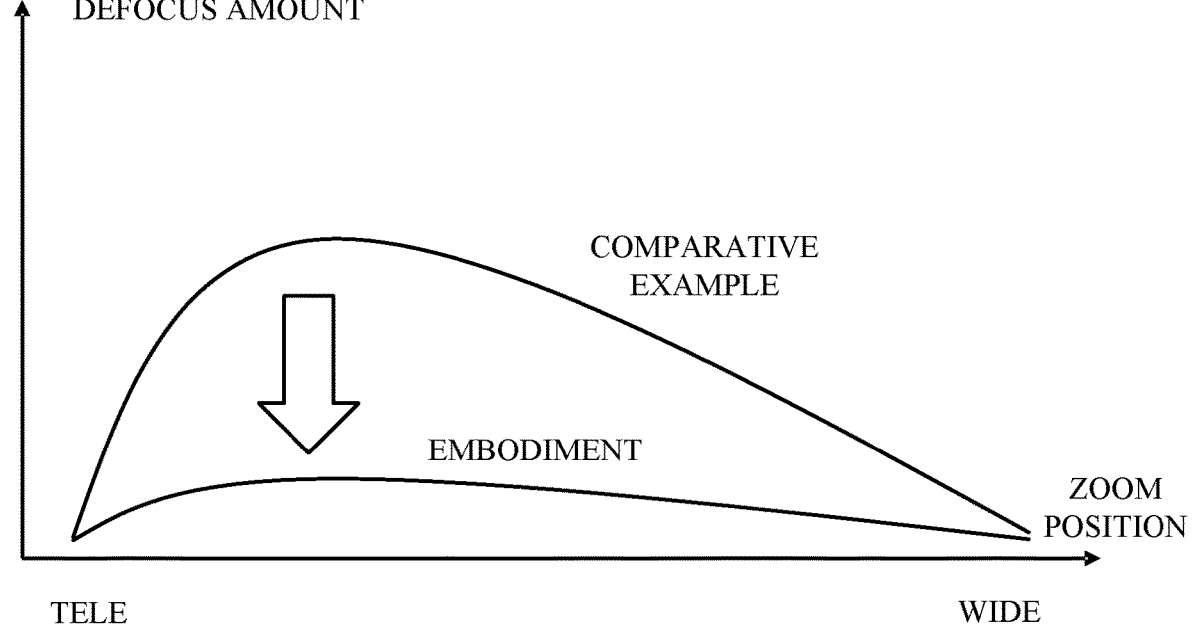
FIG. 5 is a comparison diagram between the comparative example and the result of this embodiment.

FIG. 5 is a comparison diagram of the results between the comparative example and the present disclosure including this embodiment. In FIG. 5, a horizontal axis indicates a zoom position, and a vertical axis indicates an out-of-focus amount (defocus amount) during zooming. As illustrated in FIG. 5, the present disclosure including this embodiment can reduce the out-of-focus amount more efficiently than the comparative example.

Second Embodiment

Figure 6:
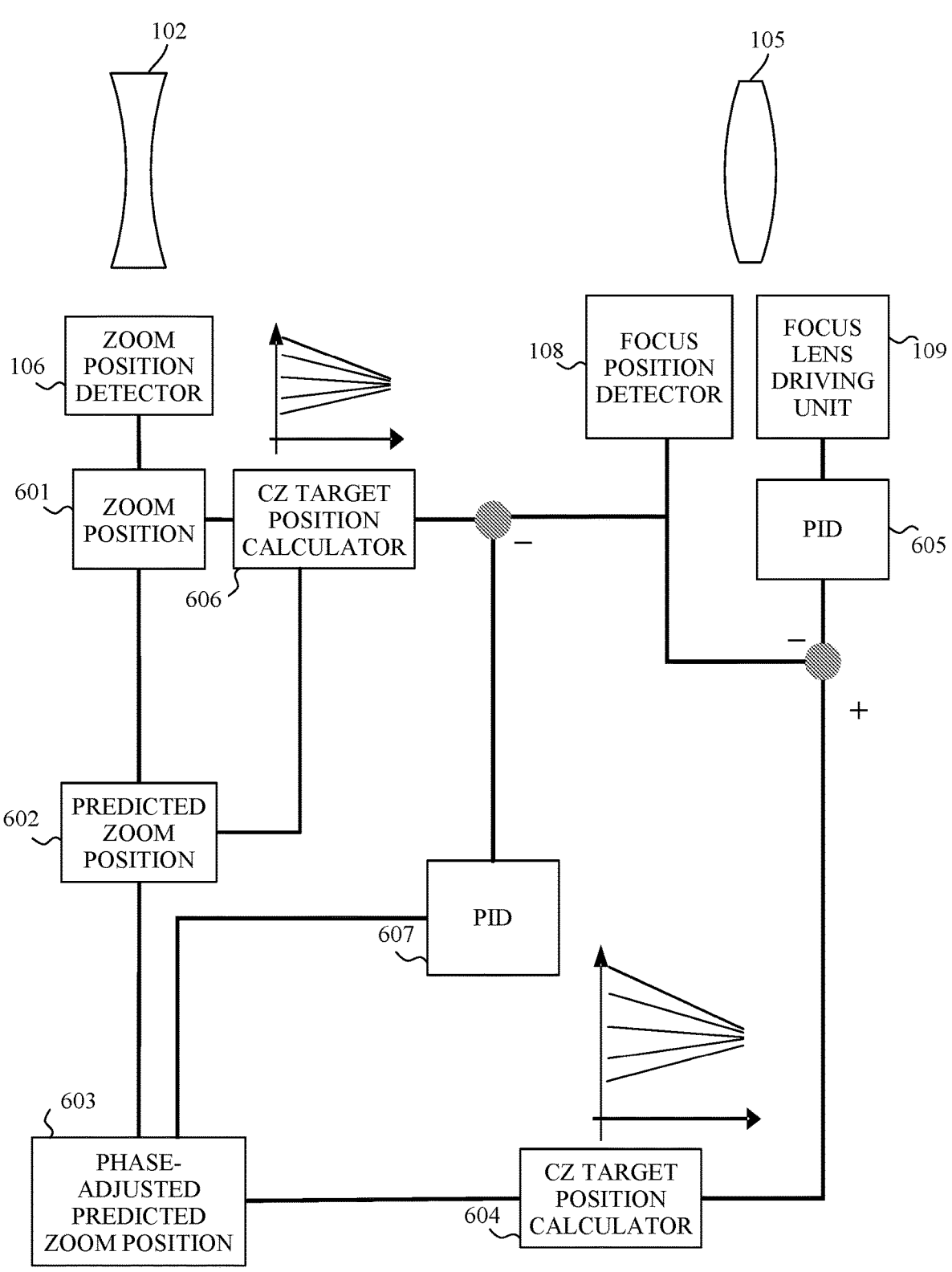
FIG. 6 explains a control method according to a second embodiment.

Referring now to FIG. 6, a description will be given of a control method according to a second embodiment. FIG. 6 explains the control method according to this embodiment.

First, the zoom position detector 106 detects a change in the magnification-varying lens unit 102 (the current position of the magnification-varying lens unit 102). The zoom position detector 106 detects the position (zoom position) of the magnification-varying lens unit 102 based, for example, on a change in a variable resistance mechanically linked to the zoom operation ring. The lens microcomputer 110 reads a digital detection signal (zoom position 601) acquired by A/D converting the detected position of the magnification-varying lens unit 102. The lens microcomputer 110 periodically stores data on the zoom position (detected position, current position) 601 in the internal memory. Then, the lens microcomputer 110 predicts the next speed based on the difference between a plurality of past data regarding the zoom position 601, assuming that the magnification-varying lens unit 102 is in uniform linear motion. The lens microcomputer 110 can predict the acceleration based on a speed change and calculate a predicted zoom position 602 at the timing of the next cycle.

The lens microcomputer 110 calculates a position change amount (slope of the electronic cam data) of the focus lens unit 105 using a CZ target position calculator 606 based on the current zoom position 601, the predicted zoom position 602, setting data of the object distance, and the electronic cam data of FIG. 2. Then, the lens microcomputer 110 calculates a difference (deviation amount) between the focus position (position information of the focus lens unit 105) corresponding to the position change amount and the detected position of the focus lens unit 105 acquired from the focus position detector 108. Then, the lens microcomputer 110 adds a proper PID component 607 to the deviation amount and calculates a corrected position (phase-adjusted predicted zoom position 603) in which delay compensation (phase compensation) is performed for the predicted zoom position 602.

The lens microcomputer 110 calculates (acquires) the position (target position) the focus lens unit 105 that will be in focus at the next cycle using the CZ target position calculator 604 based on the phase-adjusted predicted zoom position 603, setting data of the current object distance, and the electronic cam data illustrated in FIG. 2. Then, the lens microcomputer 110 performs position feedback control by performing PID control 605 using the focus lens driving unit 109 and the focus position detector 108 so that the focus lens unit 105 moves to the calculated target position.

As described above, the lens microcomputer 110 acquires the position information of the focus lens unit 105 using the CZ target position calculator 606 based on the locus information and the detected position of the magnification-varying lens unit 102. Then, the lens microcomputer 110 corrects the predicted position of the magnification-varying lens unit 102 based on a difference between the detected position of the focus lens unit 105 acquired from the focus position detector 108 and the position information of the focus lens unit 105. The lens microcomputer 110 then determines the target position of the focus lens unit 105 based on the corrected predicted position.

This embodiment calculates the corrected position (phase-adjusted predicted zoom position 603) using the detected position of the focus lens unit 105. Performing position feedback control for the focus lens unit 105 using the corrected position can reduce the phase delay of the predicted zoom position and sufficiently reduce the out-of-focus blur caused by the change of the zoom position.

Third Embodiment

Figure 7:
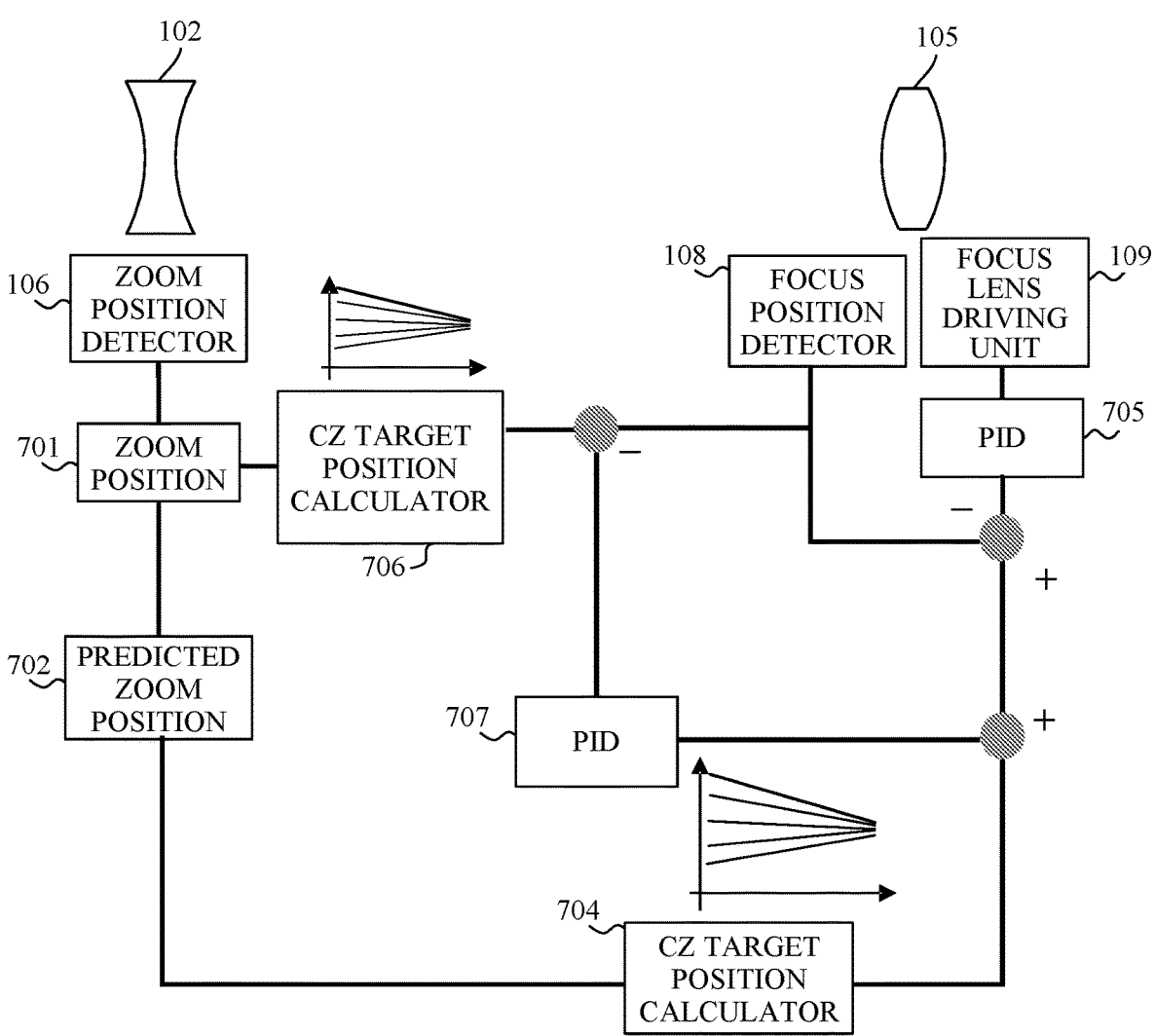
FIG. 7 explains a control method according to a third embodiment.

Referring now to FIG. 7, a description will be given of a control method according to a third embodiment. FIG. 7 explains the control method according to this embodiment.

First, the zoom position detector 106 detects a change in the magnification-varying lens unit 102 (the current position of the magnification-varying lens unit 102). The zoom position detector 106 detects the position (zoom position) of the magnification-varying lens unit 102 based, for example, on a change in a variable resistance mechanically linked to the zoom operation ring. The lens microcomputer 110 then reads a digital detection signal (zoom position 701) obtained by A/D converting the detected position of the magnification-varying lens unit 102. The lens microcomputer 110 periodically stores data on the zoom position (detected position, current position) 701 in the internal memory. Then, the lens microcomputer 110 predicts the next speed based on a difference between the plurality of past data regarding the zoom position 701, assuming that the magnification-varying lens unit 102 is in uniform linear motion. The lens microcomputer 110 can predict the acceleration based on a speed change, and calculate a predicted zoom position 702 at the timing of the next cycle.

The lens microcomputer 110 calculates the predicted position information of the focus lens unit 105 using the CZ target position calculator 704 based on the predicted zoom position 702, setting data of the object distance, and the electronic cam data of FIG. 2. The lens microcomputer 110 obtains a currently expected position of the focus lens unit 105 (focus position) using a CZ target position calculator 706 based on the current zoom position 701, setting data of the object distance, and the electronic cam data of FIG. 2. Then, the lens microcomputer 110 calculates a difference (deviation amount) between the focus position (detected position) detected by the focus position detector 108 and the currently expected focus position, and calculates how far the focus position advances or delays. The lens microcomputer 110 then adds an appropriate PID component 707 to the calculated value.

The lens microcomputer 110 adds the calculated value to which the PID component 707 has been added, to the predicted position information of the focus lens unit 105 calculated using the CZ target position calculator 704, and thereby calculates the target position of the focus lens unit 105. Then, the lens microcomputer 110 performs position feedback control by performing PID control 705 using the focus lens driving unit 109 and the focus position detector 108 so that the focus lens unit 105 moves to the calculated target position.

As described above, the lens microcomputer 110 acquires position information of the focus lens unit 105 using the CZ target position calculator 706 based on the locus information and the detected position of the magnification-varying lens unit 102. The lens microcomputer 110 acquires predicted position information of the focus lens unit 105 using the CZ target position calculator 704 based on the locus information and the predicted position of the magnification-varying lens unit 102. Then, the lens microcomputer 110 determines the target position of the focus lens unit based on a difference between the detected position of the focus lens unit acquired from the focus position detector 108 and the position information of the focus lens unit, and the predicted position information of the focus lens unit.

This embodiment calculates the target position of the focus lens unit 105 by correcting the predicted position information of the focus lens unit 105 calculated using the CZ target position calculator 704 (corrects the target position calculated by the CZ target position calculator 704). Performing position feedback control for the focus lens unit 105 using the corrected position can reduce the phase delay of the predicted zoom position and sufficiently reduce the out-of-focus blur caused by the change of the zoom position.

Fourth Embodiment

Figure 8:
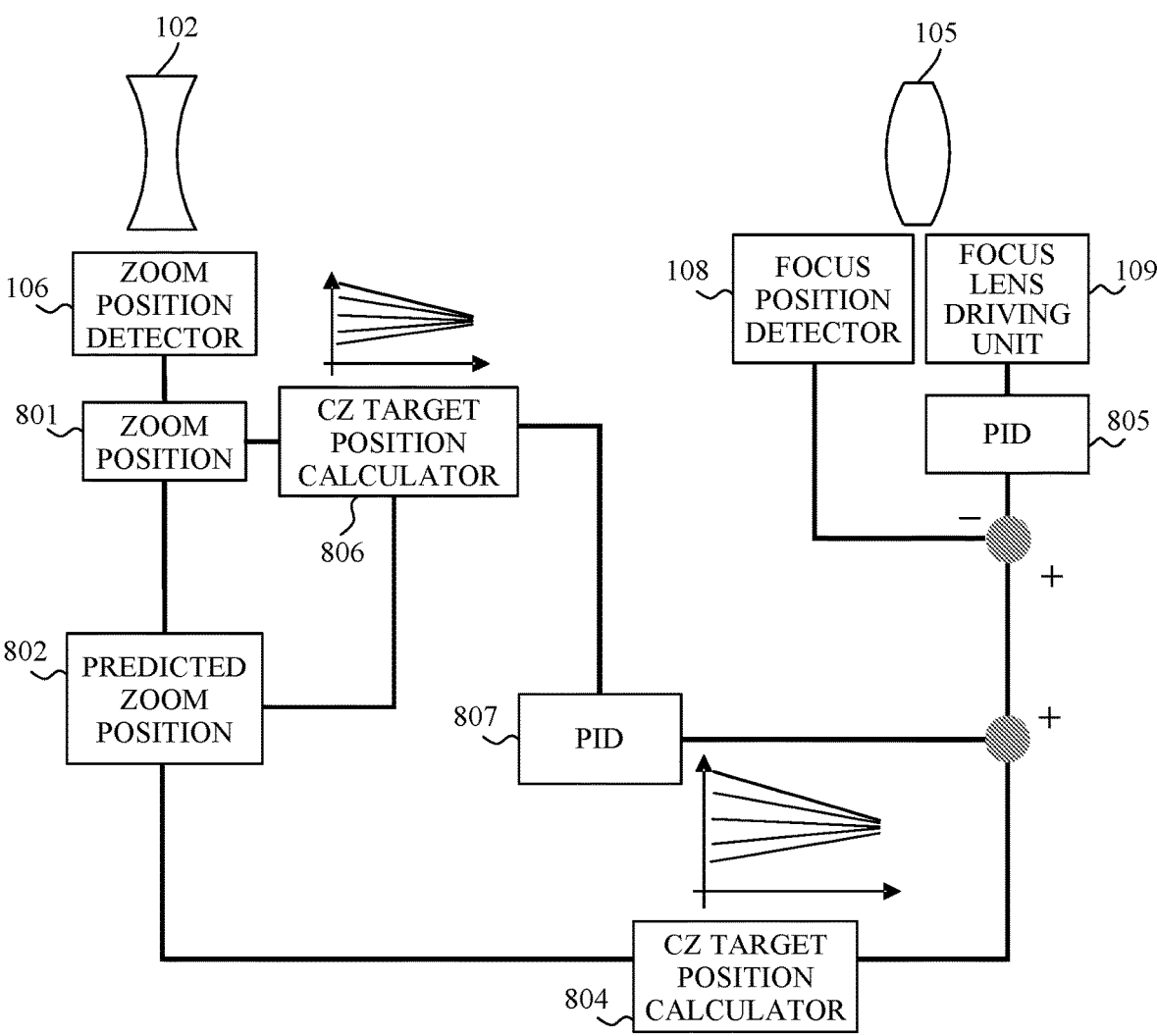
FIG. 8 explains a control method according to a fourth embodiment.

Referring now to FIG. 8, a description will be given of a control method according to the fourth embodiment. FIG. 8 explains the control method according to this embodiment.

First, the zoom position detector 106 detects a change in the magnification-varying lens unit 102 (the current position of the magnification-varying lens unit 102). The zoom position detector 106 detects the position (zoom position) of the magnification-varying lens unit 102 based, for example, on a change in a variable resistance mechanically linked to the zoom operation ring. The lens microcomputer 110 then reads a digital detection signal (zoom position 801) obtained by A/D converting the detected position of the magnification-varying lens unit 102. The lens microcomputer 110 periodically stores data on the zoom position (detected position, current position) 801 in the internal memory. Then, the lens microcomputer 110 predicts the next speed based on a difference between the plurality of past data regarding the zoom position 801, assuming that the magnification-varying lens unit 102 is in uniform linear motion. The lens microcomputer 110 can predict the acceleration based on a speed change and calculate a predicted zoom position 802 at the timing of the next cycle.

The lens microcomputer 110 calculates the predicted position information of the focus lens unit 105 using the CZ target position calculator 804 based on the predicted zoom position 802, set data of the object distance, and the electronic cam data illustrated in FIG. 2. The lens microcomputer 110 obtains the next expected position (target focus position) of the next focus lens unit 105 using the CZ target position calculator 806 based on the zoom position 801, the predicted zoom position 802, set data of the object distance, and the electronic cam data illustrated in FIG. 2. The lens microcomputer 110 then adds a proper PID component 807 to the target focus position.

The lens microcomputer 110 calculates the target position of the focus lens unit 105 by adding the target focus position to which the PID component 807 has been added, to the predicted position information of the focus lens unit 105 calculated using the CZ target position calculator 804. That is, the lens microcomputer 110 calculates, as a target position, the position of the focus lens unit 105 that will be in focus at the next cycle rather than the target focus position. Then, the lens microcomputer 110 performs position feedback control by performing PID control 805 using the focus lens driving unit 109 and the focus position detector 108 so that the focus lens unit 105 moves to the calculated target position.

As described above, the lens microcomputer 110 acquires the position information (target focus position) of the focus lens unit 105 using the CZ target position calculator 806 based on the locus information and the detected position of the magnification-varying lens unit 102. The lens microcomputer 110 acquires predicted position information of the focus lens unit 105 using the CZ target position calculator 804 based on the locus information and the predicted position of the magnification-varying lens unit 102. Then, the lens microcomputer 110 determines the target position of the focus lens unit 105 based on the position information of the focus lens unit 105 and the predicted position information of the focus lens unit 105.

This embodiment calculates the target position of the focus lens unit 105 by correcting the predicted position information of the focus lens unit 105 calculated using the CZ target position calculator 704 (corrects the target position calculated by the CZ target position calculator 704). Performing position feedback control on the focus lens unit 105 using the corrected position can reduce the phase delay of the predicted zoom position and sufficiently reduce the out-of-focus blur caused by the change of the zoom position.

Fifth Embodiment

Figure 9:
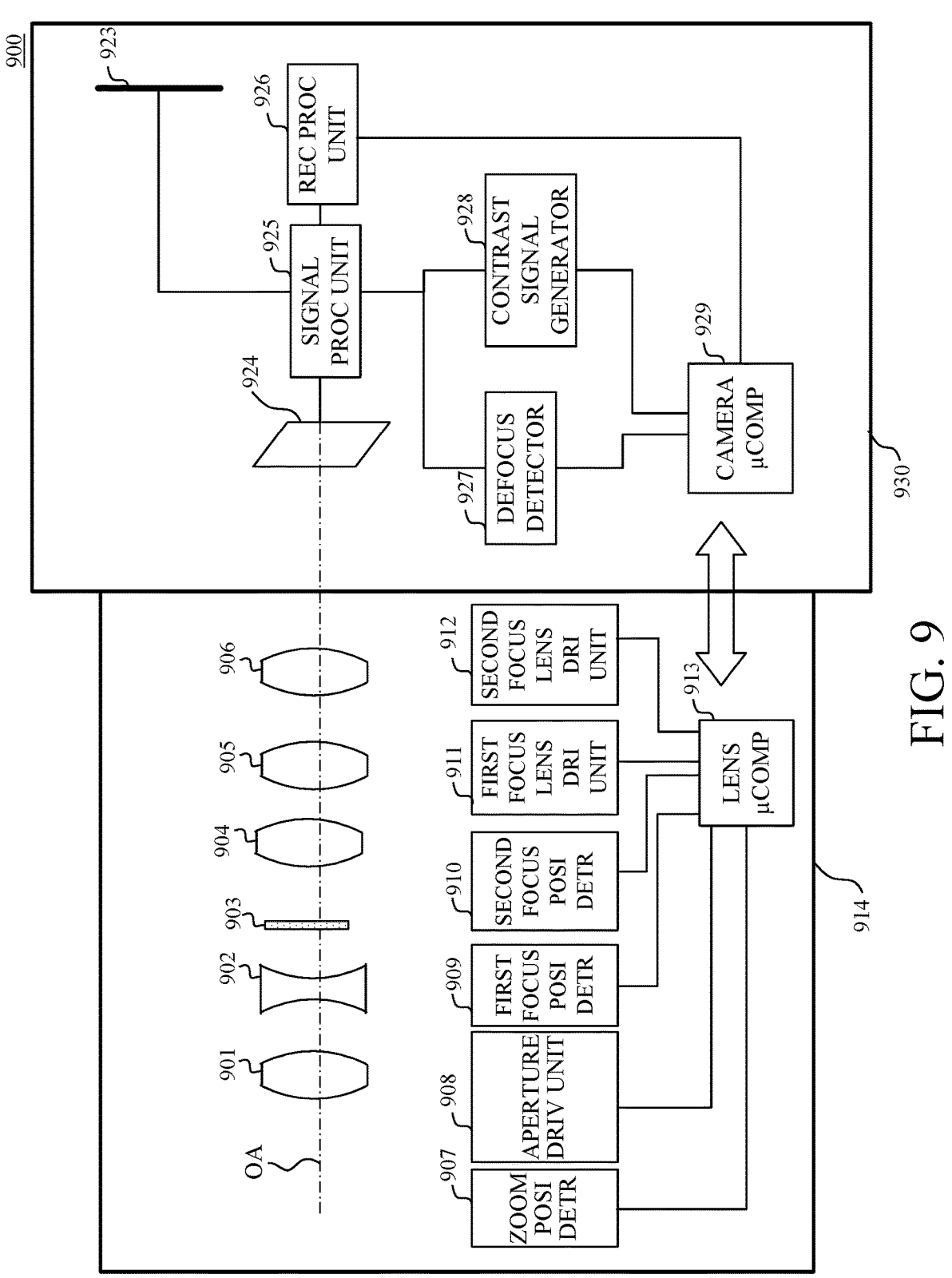
FIG. 9 is a block diagram of an image pickup apparatus according to a fifth embodiment.

A description will now be given of a fifth embodiment. Referring now to FIG. 9, a description will be given of an image pickup apparatus 900 according to this embodiment.

FIG. 9 is a block diagram of the image pickup apparatus 900. The image pickup apparatus 900 is a lens interchangeable type camera system, and includes a camera body (image pickup apparatus body) 930 and an interchangeable lens (lens apparatus) 914 attachable to and detachable from the camera body 930. This embodiment is not limited to this example, and is applicable to an image pickup apparatus in which a camera body and a lens apparatus are integrated.

The interchangeable lens 914 is different from the interchangeable lens 111 having the single focus lens unit 105 described with reference to FIG. 1 in having, as focus lens unit, a first focus lens 904 and a second focus lens 905 that are driven independently of each other. The interchangeable lens 914 further includes a first focus position detector 909 configured to detect the position of the first focus lens 904 (first focus position) and a second focus position detector 910 configured to detect the position of the second focus lens 905 (second focus position). The interchangeable lens 914 further includes a first focus lens driving unit 911 configured to drive the first focus lens 904 and a second focus lens driving unit 912 configured to drive the second focus lens 905. The optical system (imaging optical system) of the interchangeable lens 914 includes a first lens 901, a magnification-varying lens unit 902, an aperture stop (diaphragm) 903, a first focus lens 904, a second focus lens 905, and a fourth lens 906.

A zoom position detector 907, aperture driving unit 908, and lens microcomputer (control unit) 913 in the interchangeable lens 914 correspond to the zoom position detector 106, aperture driving unit 107, and lens microcomputer 110 in the interchangeable lens 111, respectively. The components (923-929) in the camera body 930 correspond to the components (121-127) in the camera body 128 described with reference to FIG. 1. A description of corresponding components will be omitted.

Figure 10:
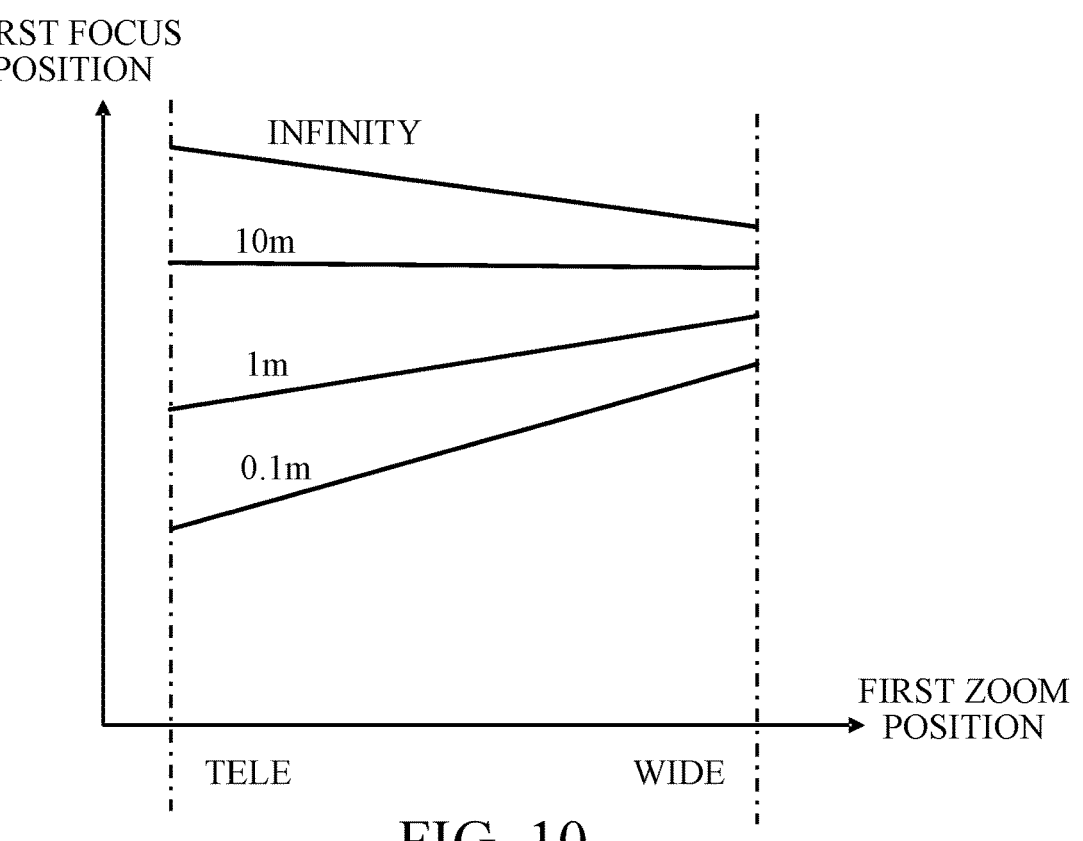
FIG. 10 illustrates a relationship between a zoom position, a focus position, and an object distance in the fifth embodiment.
Figure 11:
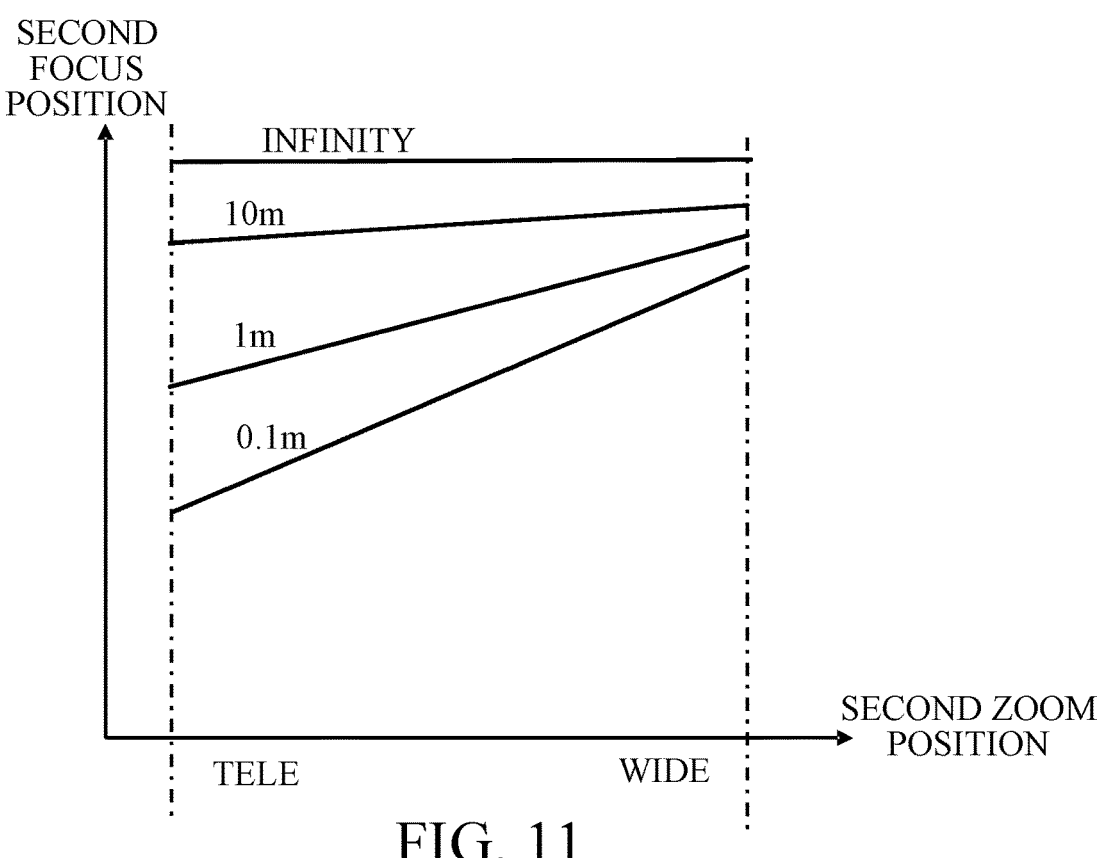
FIG. 11 illustrates a relationship between a zoom position, another focus position, and an object distance in the fifth embodiment.

FIG. 10 is a diagram (electronic cam data) illustrating a relationship between the position of the magnification-varying lens unit 902 (zoom position), the position of the first focus lens 904 (first focus position), and the object distance. That is, FIG. 10 illustrates first locus information indicating a relationship between the zoom position and the first focus position where an in-focus state is achieved at the zoom position. FIG. 11 is a diagram (electronic cam data) illustrating a relationship between the position of the magnification-varying lens unit 902 (zoom position), the position of the second focus lens 905 (second focus position), and the object distance. That is, FIG. 11 illustrates second locus information indicating a relationship between the zoom position and the second focus position where an in-focus state is achieved at the zoom position.

In each of FIGS. 10 and 11, a horizontal axis indicates a zoom position (telephoto end (TELE) to wide-angle end (WIDE)), and a vertical axis indicates a first focus position. FIG. 10 also illustrates four lines of the same object distance of infinity, 10 m, 1 m, and 0.1 m in order from the top. For example, in order to maintain the in-focus state at infinity during zooming, the focus position must be controlled over the line of the same object distance indicated as "infinity" at the top. 10 and 11. The same object distances not illustrated in FIGS. 10 and 11 can be obtained freely by calculating a distance ratio between the cam loci.

In a case where the focus lens unit includes a plurality of focus lenses, as illustrated in FIGS. 10 and 11, by moving the first focus lens 904 and the second focus lens 905 to positions indicated by mutually different electronic cam data, the same object distance can become in the in-focus state.

Figure 12:
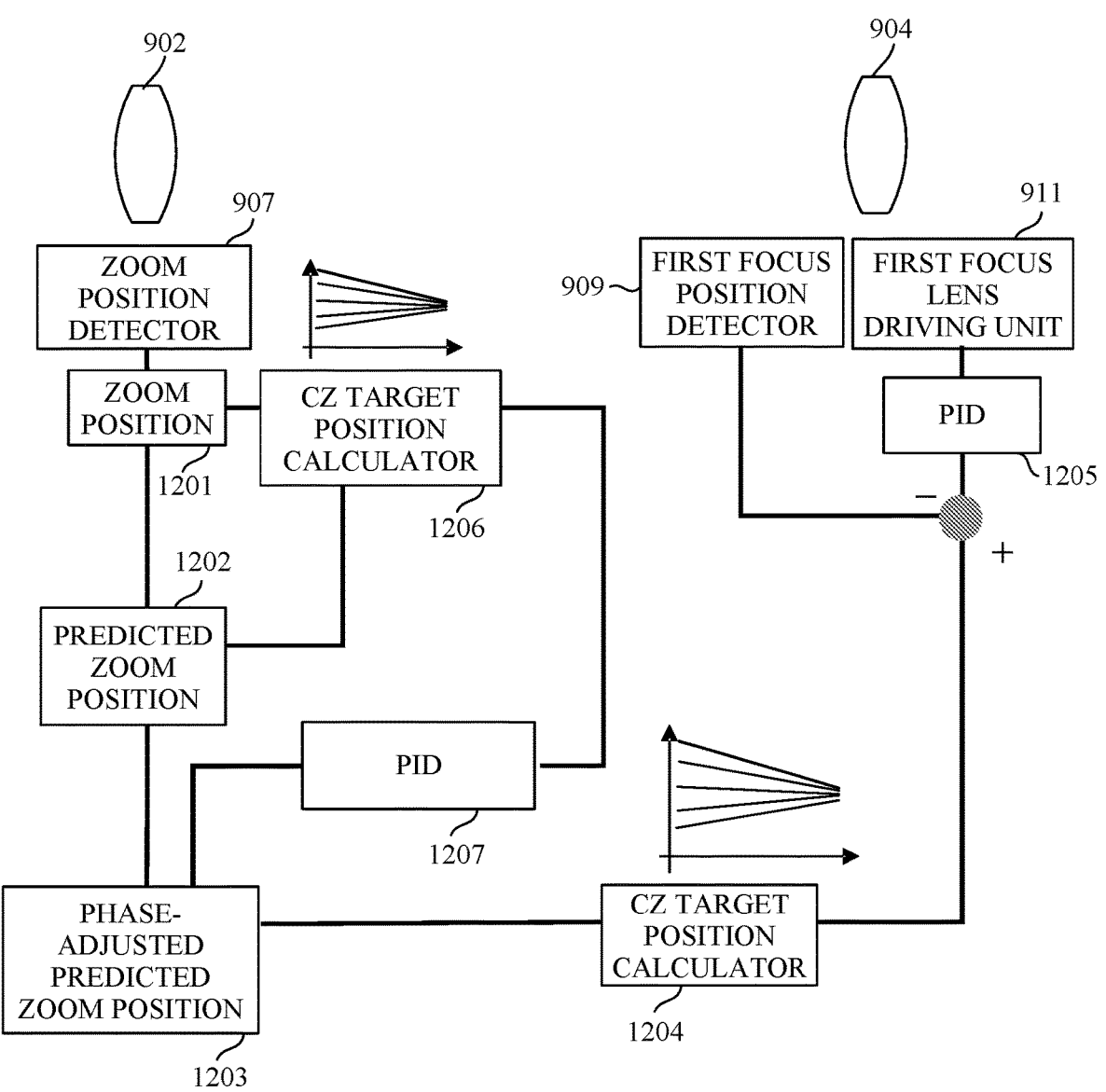
FIG. 12 explains a control method according to the fifth embodiment.
Figure 13:
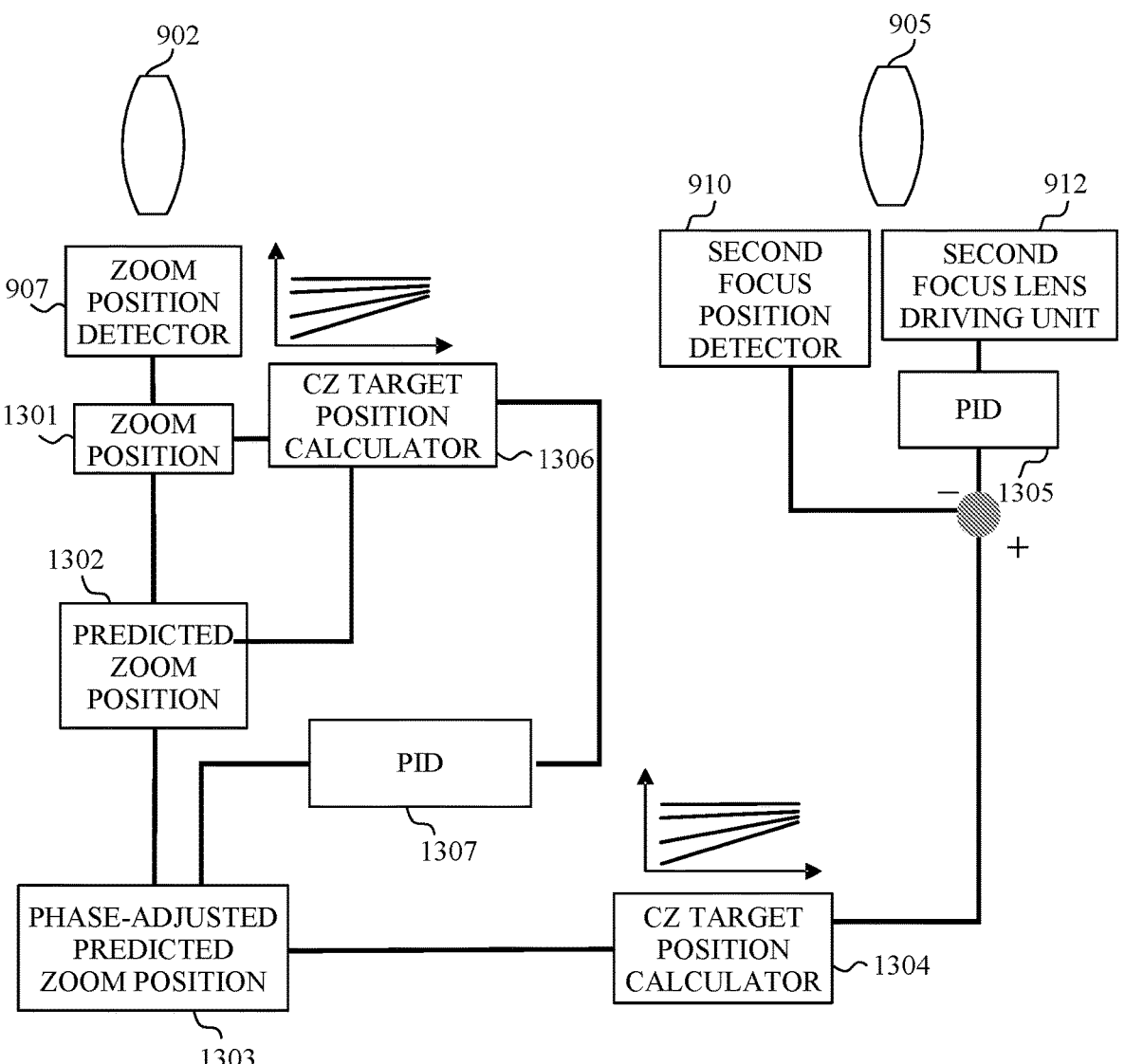
FIG. 13 explains another control method according to the fifth embodiment.

Referring now to FIGS. 12 and 13, a control method in a case where the focus lens unit includes a plurality of focus lenses. FIGS. 12A and 12B explain a control method of the first focus lens 904.

First, the zoom position detector 907 detects a change in the magnification-varying lens unit 902 (the current position of the magnification-varying lens unit 902). The zoom position detector 907 detects the position (zoom position) of the magnification-varying lens unit 902 based, for example, on a change in a variable resistance mechanically linked to the zoom operation ring. The lens microcomputer 913 then reads a digital detection signal (zoom position 1201) obtained by A/D converting the detected position of the magnification-varying lens unit 902. The lens microcomputer 913 periodically stores data on the zoom position (detected position, current position) 1201 in the internal memory. Then, the lens microcomputer 913 predicts the next speed based on a difference between the plurality of past data regarding the zoom position 1201, assuming that the magnification-varying lens unit 902 is in uniform linear motion. The lens microcomputer 913 can predict the acceleration based on a speed change and calculate a predicted zoom position 1202 at the timing of the next cycle.

The lens microcomputer 913 calculates a position change amount of the first focus lens 904 (slope of the electronic cam data) using the CZ target position calculator 1206 based on the zoom position 1201, the predicted zoom position 1202, set data of the object distance, and the electronic cam data illustrated in FIG. 10. Then, the lens microcomputer 913 adds a proper PID component 1207 to the position change amount and calculates a corrected position (phase-adjusted predicted zoom position 1203) in which delay compensation (phase compensation) is performed for the predicted zoom position 1202.

The lens microcomputer 913 calculates (acquires) a position (first target position) of the first focus lens 904 that will be in focus in the next cycle using the CZ target position calculator 1204 based on the phase-adjusted predicted zoom position 1203, setting data of the current object distance, and the electronic cam data illustrated in FIG. 10. Then, the lens microcomputer 913 performs feedback control by performing PID control 1205 using the first focus lens driving unit 911 and the first focus position detector 909 so that the first focus lens 904 moves to the calculated target position.

FIG. 13 explains a control method for the second focus lens 905. First, the zoom position detector 907 detects a change in the magnification-varying lens unit 902 (the current position of the magnification-varying lens unit 902). The zoom position detector 907 detects the position (zoom position) of the magnification-varying lens unit 902 based, for example, on a change in a variable resistance mechanically linked to the zoom operation ring. The lens microcomputer 913 then reads a digital detection signal (zoom position 1301) obtained by A/D converting the detected position of the magnification-varying lens unit 902. The lens microcomputer 913 periodically stores data on the zoom position (detected position, current position) 1301 in the internal memory. Then, the lens microcomputer 913 predicts the next speed based on a difference between the plurality of past data regarding the zoom position 1301, assuming that the magnification-varying lens unit 902 is in uniform linear motion. The lens microcomputer 913 can predict acceleration based on a speed change and calculate a predicted zoom position 1302 at the timing of the next cycle.

The lens microcomputer 913 calculates (acquires) a position change amount (slope of electronic cam data) of the second focus lens 905 using the CZ target position calculator

1306 based on the zoom position 1301, the predicted zoom position 1302, set data of the object distance, and the electronic cam data illustrated in FIG. 11. Then, the lens microcomputer 913 adds a proper PID component 1307 to the position change amount and calculates a corrected position (phase-adjusted predicted zoom position 1303) in which delay compensation (phase compensation) is performed for the predicted zoom position 1302.

The lens microcomputer 913 calculates (acquires) a position (second target position) of the second focus lens 905 that will be in focus at the next cycle using the CZ target position calculator 1304 based on the phase-adjusted predicted zoom position 1303, setting data of the current object distance, and the electronic cam data illustrated in FIG. 11. Then, the lens microcomputer 913 performs feedback control by performing PID control 1305 using the second focus lens driving unit 912 and the second focus position detector 910 so that the second focus lens 905 moves to the calculated target position.

Even in a case where the focus lens unit includes a plurality of focus lenses, this embodiment can reduce the phase delay of the predicted zoom position and sufficiently reduce the out-of-focus blur caused by the change of the zoom position. The controls described in the second to fourth embodiments may be applied to the first focus lens 904 and the second focus lens 905 in this embodiment.

This embodiment can provide a lens apparatus that can reduce out-of-focus blur during zooming.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

Each of the above embodiment can provide a lens apparatus, an image pickup apparatus, a method of controlling the lens apparatus, and a storage medium, each of which can reduce out-of-focus blur during zooming.

This application claims the benefit of Japanese Patent Application No. 2022-143432, filed on Sep. 9, 2022, which is hereby incorporated by reference herein in its entirety.

What is claimed is:

1. A lens apparatus comprising:

an optical system including a focus lens unit and a magnification-varying lens unit; and a processor configured to control driving of the focus lens unit, wherein the processor is configured to:

acquire a detected position of the magnification-varying lens unit from a zoom position detector, acquire a predicted position based on the detected position of the magnification-varying lens unit, determine a target position of the focus lens unit according to the predicted position of the magnification-varying lens unit based on locus information indicating a relationship between a position of the magnification-varying lens unit and a position of the focus lens unit that is in focus at the position of the magnification-varying lens unit, and the detected position of the magnification-varying lens unit, determine the target position of the focus lens unit based on the locus information, the detected position of the magnification-varying lens unit, and the predicted position of the magnification-varying lens unit, acquire speed information and acceleration information of the focus lens unit based on the locus information, the detected position of the magnification-varying lens unit, and the predicted position of the magnification-varying lens unit, correct the predicted position of the magnification-varying lens unit based on the predicted position of the magnification-varying lens unit and the speed information and the acceleration information of the focus lens unit, and determine the target position of the focus lens unit based on a corrected predicted position.

2. The lens apparatus according to claim 1, wherein the processor is configured to correct the predicted position of the magnification-varying lens unit by performing phase compensation for the predicted position of the magnification-varying lens unit.

3. The lens apparatus according to claim 1, wherein the processor is configured to:

acquire position information of the focus lens unit based on the locus information and the detected position of the magnification-varying lens unit, correct the predicted position of the magnification-varying lens unit based on a difference between a detected position of the focus lens unit acquired from a focus position detector and the position information of the focus lens unit, and determine the target position of the focus lens unit based on a corrected predicted position.

4. The lens apparatus according to claim 1, wherein the processor is configured to:

acquire position information of the focus lens unit based on the locus information and the detected position of the magnification-varying lens unit, acquire predicted position information of the focus lens unit based on the locus information and the predicted position of the magnification-varying lens unit, and determine the target position of the focus lens unit based on a difference between a detected position of the focus lens unit acquired from a focus position detector and the position information of the focus lens unit, and the predicted position information of the focus lens unit.

5. The lens apparatus according to claim 1, wherein the processor is configured to:

acquire position information of the focus lens unit based on the locus information and the detected position of the magnification-varying lens unit, acquire predicted position information of the focus lens unit based on the locus information and the predicted position of the magnification-varying lens unit, and determine the target position of the focus lens unit based on the position information of the focus lens unit and the predicted position information of the focus lens unit.

6. The lens apparatus according to claim 1, wherein the focus lens unit includes a first focus lens and a second focus lens that are drivable independently of each other, wherein the locus information includes first locus information indicating a relationship between the position of the magnification-varying lens unit and a position of the first focus lens that is in focus at the position of the magnification-varying lens unit, and second locus information indicating a relationship between the position of the magnification-varying lens unit and a position of the second focus lens that is in focus at the position of the magnification-varying lens unit, wherein the target position includes a first target position of the first focus lens and a second target position of the second focus lens, and wherein the processor is configured to:

determine the first target position of the first focus lens according to the predicted position of the magnification-varying lens unit based on the first locus information and the detected position of the magnification-varying lens unit, and determine the second target position of the second focus lens according to the predicted position of the magnification-varying lens unit based on the second locus information and the detected position of the magnification-varying lens unit.

7. The lens apparatus according to claim 1, further comprising a memory configured to store the locus information.

8. An image pickup apparatus comprising:

an image sensor; and the lens apparatus according to claim 1.

9. A control method of a lens apparatus including a focus lens unit and a magnification-varying lens unit, the control method comprising the steps of:

acquiring a detected position of the magnification-varying lens unit from a zoom position detector; and acquiring a predicted position based on the detected position of the magnification-varying lens unit, determining a target position of the focus lens unit according to a predicted position of the magnification-varying lens unit based on locus information indicating a relationship between a position of the magnification-varying lens unit and a position of the focus lens unit that is in focus at the position of the magnification-varying lens unit, and the detected position of the magnification-varying lens unit, determining the target position of the focus lens unit based on the locus information, the detected position of the magnification-varying lens unit, and the predicted position of the magnification-varying lens unit, acquiring speed information and acceleration information of the focus lens unit based on the locus information, the detected position of the magnification-varying lens unit, and the predicted position of the magnification-varying lens unit, correcting the predicted position of the magnification-varying lens unit based on the predicted position of the magnification-varying lens unit and the speed information and the acceleration information of the focus lens unit, and determining the target position of the focus lens unit based on a corrected predicted position.

10. A non-transitory computer-readable storage medium storing a program that causes a computer to execute the control method according to claim 9.

11. A lens apparatus comprising:

an optical system including a focus lens unit and a magnification-varying lens unit; and a processor configured to control driving of the focus lens unit, wherein the processor is configured to:

acquire a detected position of the magnification-varying lens unit from a zoom position detector, acquire a predicted position based on the detected position of the magnification-varying lens unit, determine a target position of the focus lens unit according to the predicted position of the magnification-varying lens unit based on locus information indicating a relationship between a position of the magnification-varying lens unit and a position of the focus lens unit that is in focus at the position of the magnification-varying lens unit, and the detected position of the magnification-varying lens unit, determine the target position of the focus lens unit based on the locus information, the detected position of the magnification-varying lens unit, and the predicted position of the magnification-varying lens unit, determine the first target position of the first focus lens according to the predicted position of the magnification-varying lens unit based on the first locus information and the detected position of the magnification-varying lens unit, and determine the second target position of the second focus lens according to the predicted position of the magnification-varying lens unit based on the second locus information and the detected position of the magnification-varying lens unit, wherein the focus lens unit includes a first focus lens and a second focus lens that are drivable independently of each other, wherein the locus information includes first locus information indicating a relationship between the position of the magnification-varying lens unit and a position of the first focus lens that is in focus at the position of the magnification-varying lens unit, and second locus information indicating a relationship between the position of the magnification-varying lens unit and a position of the second focus lens that is in focus at the position of the magnification-varying lens unit, and wherein the target position includes a first target position of the first focus lens and a second target position of the second focus lens.

\* \* \* \* \*